United States Patent

Vithala

(10) Patent No.: US 10,398,126 B2
(45) Date of Patent: Sep. 3, 2019

(54) ANIMAL FEEDING ASSEMBLY

(71) Applicant: Rama Vithala, Farmington, CT (US)

(72) Inventor: Rama Vithala, Farmington, CT (US)

( * ) Notice: Subject to any disclaimer, the term of this patent is extended or adjusted under 35 U.S.C. 154(b) by 330 days.

(21) Appl. No.: 15/343,879

(22) Filed: Nov. 4, 2016

(65) Prior Publication Data

US 2018/0125029 A1    May 10, 2018

(51) Int. Cl.
*A01K 5/01*        (2006.01)

(52) U.S. Cl.
CPC .................. *A01K 5/0135* (2013.01)

(58) Field of Classification Search
CPC ..... A01K 5/0114; A01K 7/005; A01K 5/0135
USPC ...................... 119/61.5, 51.5, 61.56
See application file for complete search history.

(56) References Cited

U.S. PATENT DOCUMENTS

| | | | | |
|---|---|---|---|---|
| 1,855,314 A * | 4/1932 | Schacht | .................. | A01K 5/01 119/51.5 |
| 2,789,533 A * | 4/1957 | Hatch | .................. | A01K 5/0225 119/51.5 |
| 2,845,896 A * | 8/1958 | Copeland | ............. | A01K 5/0114 119/51.01 |
| 4,205,629 A * | 6/1980 | Wix | ..................... | A01K 5/0114 119/51.5 |
| 4,793,290 A * | 12/1988 | O'Donnell | ............. | A01K 5/025 119/55 |
| 4,860,691 A * | 8/1989 | Mayer | .................. | A01K 5/0114 119/51.5 |
| 5,209,184 A | 5/1993 | Sharkan et al. | | |
| 5,458,087 A * | 10/1995 | Prior | .................... | A01K 5/0114 119/51.5 |
| 5,546,894 A | 8/1996 | St-Pierre | | |
| 5,560,315 A | 10/1996 | Lampe | | |
| 5,743,210 A * | 4/1998 | Lampe | ................. | A01K 5/0114 119/51.5 |
| 5,752,464 A | 5/1998 | King et al. | | |
| 5,775,255 A * | 7/1998 | Louviere, III | ....... | A01K 5/0142 119/51.5 |
| 5,924,384 A * | 7/1999 | Deitrich | ............... | A01K 1/0356 119/416 |
| 6,099,693 A * | 8/2000 | Palmer | ..................... | C02F 1/18 159/34 |
| 6,371,047 B1 * | 4/2002 | van den Berg | .......... | A01K 5/01 119/51.02 |
| 7,073,461 B2 | 7/2006 | Gonet | | |
| 7,124,709 B1 * | 10/2006 | Greer | .................... | A01K 5/0114 119/61.5 |
| D565,805 S | 4/2008 | Modi et al. | | |
| 7,387,082 B1 | 6/2008 | Fried | | |
| 7,685,966 B2 | 3/2010 | Goehring | | |

(Continued)

*Primary Examiner* — Magdalena Topolski
*Assistant Examiner* — Morgan T Barlow

(57) ABSTRACT

An animal feeding assembly inhibits animal food and water from spilling onto a floor when an animal feeds. The assembly includes a pan that may be positioned on a support surface. A rack is selectively positioned in the pan. A pair of bowls is provided. Each of the bowls contains animal food and water. Each of the bowls is selectively positioned on the rack. Thus, the pan captures the animal food and water when the animal eats and drinks thereby inhibiting the animal food and water from spilling onto the support surface. A lid is selectively positioned on the pan. The lid inhibits the animal food and water from spilling onto the support surface.

6 Claims, 5 Drawing Sheets

(56) References Cited

U.S. PATENT DOCUMENTS

| | | | | |
|---|---|---|---|---|
| 7,938,083 | B1* | 5/2011 | Huether | A01K 5/0114 |
| | | | | 119/61.5 |
| D723,805 | S | 3/2015 | Habraken | |
| 9,095,117 | B1* | 8/2015 | Kumar | A01K 5/01 |
| 2002/0195059 | A1* | 12/2002 | King | A01K 5/0114 |
| | | | | 119/51.01 |
| 2006/0032451 | A1* | 2/2006 | Gonet | A01K 5/0114 |
| | | | | 119/61.5 |
| 2007/0034161 | A1 | 2/2007 | Thompson | |
| 2007/0181070 | A1* | 8/2007 | Conger | A01K 1/031 |
| | | | | 119/61.5 |
| 2008/0190372 | A1* | 8/2008 | Horvath | A01K 5/0114 |
| | | | | 119/61.56 |
| 2009/0241843 | A1* | 10/2009 | Becattini, Jr. | A01K 5/0135 |
| | | | | 119/51.5 |
| 2012/0247449 | A1* | 10/2012 | Ali | A47J 36/2477 |
| | | | | 126/261 |
| 2013/0145990 | A1* | 6/2013 | Macpherson | A01K 5/0142 |
| | | | | 119/61.5 |
| 2016/0235042 | A1* | 8/2016 | Anderson | A01K 53/00 |
| 2017/0303506 | A1* | 10/2017 | Wold | A01K 13/001 |
| 2018/0014504 | A1* | 1/2018 | Grinnell | A01K 5/0135 |

* cited by examiner

ANIMAL FEEDING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed under 37 CFR 1.97 and 1.98

The disclosure and prior art relates to feeding devices and more particularly pertains to a new feeding device for inhibiting animal food and water from spilling onto a floor when an animal feeds.

BRIEF SUMMARY OF THE INVENTION

An embodiment of the disclosure meets the needs presented above by generally comprising a pan that may be positioned on a support surface. A rack is selectively positioned in the pan. A pair of bowls is provided. Each of the bowls contains animal food and water. Each of the bowls is selectively positioned on the rack. Thus, the pan captures the animal food and water when the animal eats and drinks thereby inhibiting the animal food and water from spilling onto the support surface. A lid is selectively positioned on the pan. The lid inhibits the animal food and water from spilling onto the support surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
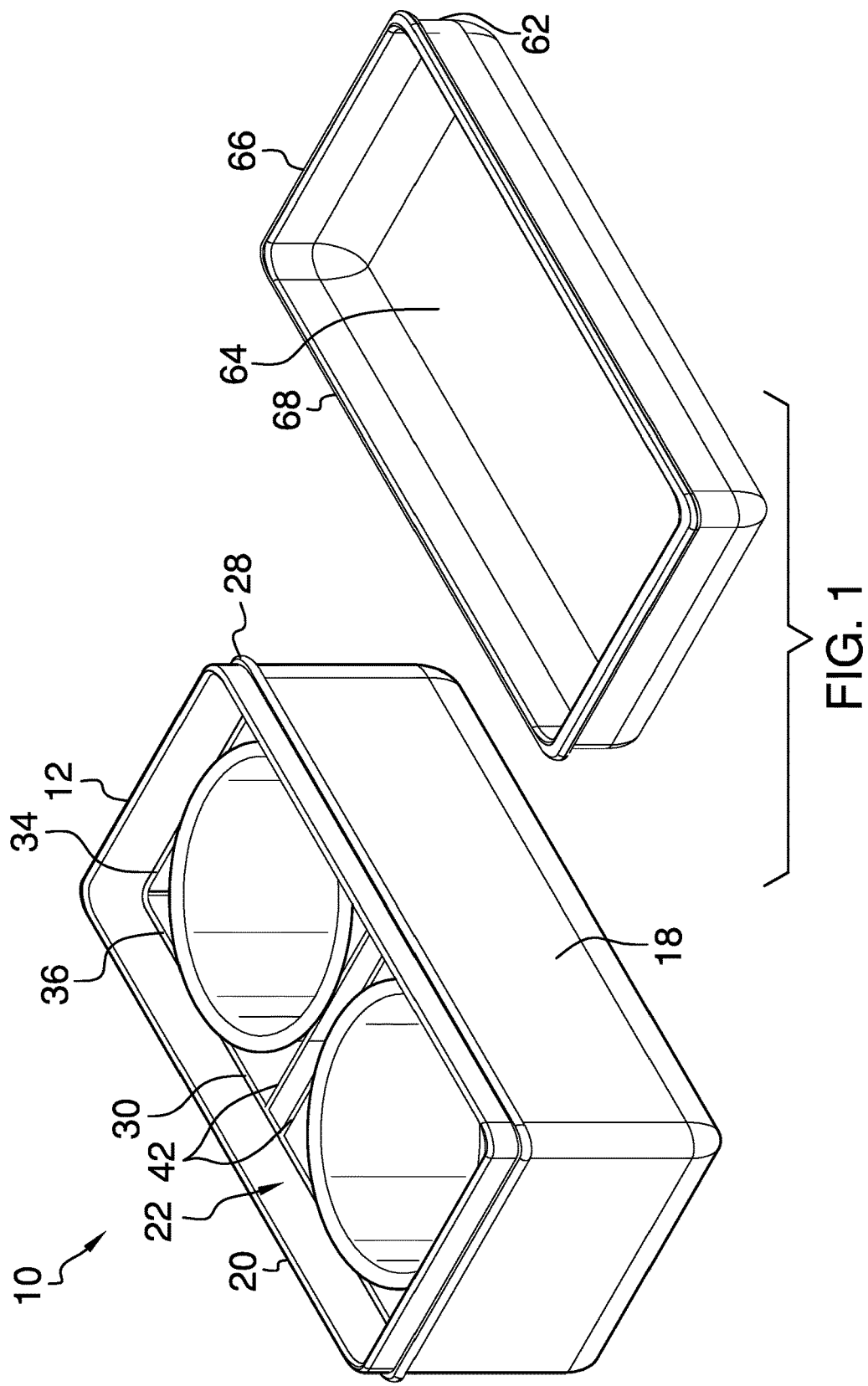
FIG. 1 is a perspective view of an animal feeding assembly according to an embodiment of the disclosure.
Figure 2:
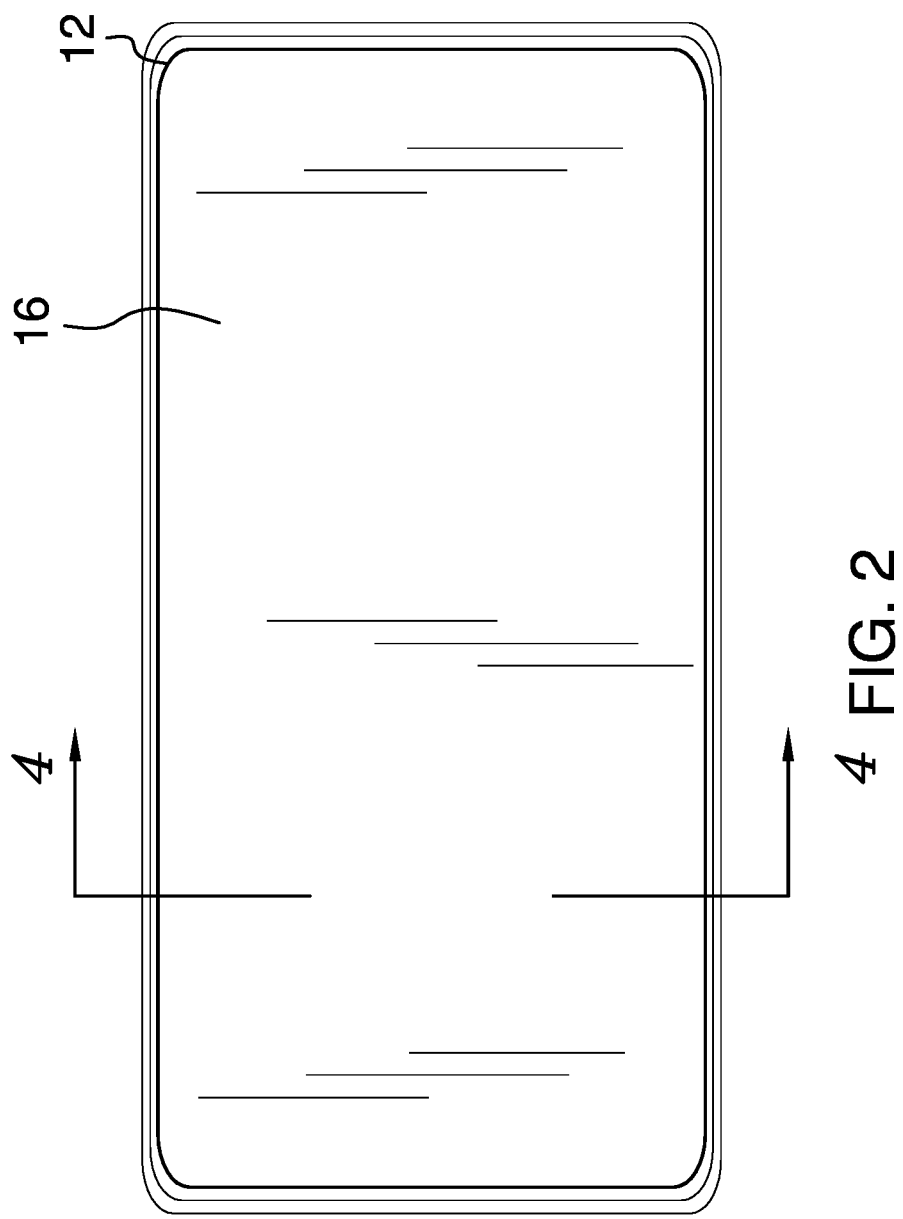
FIG. 2 is a bottom view of an embodiment of the disclosure.
Figure 3:
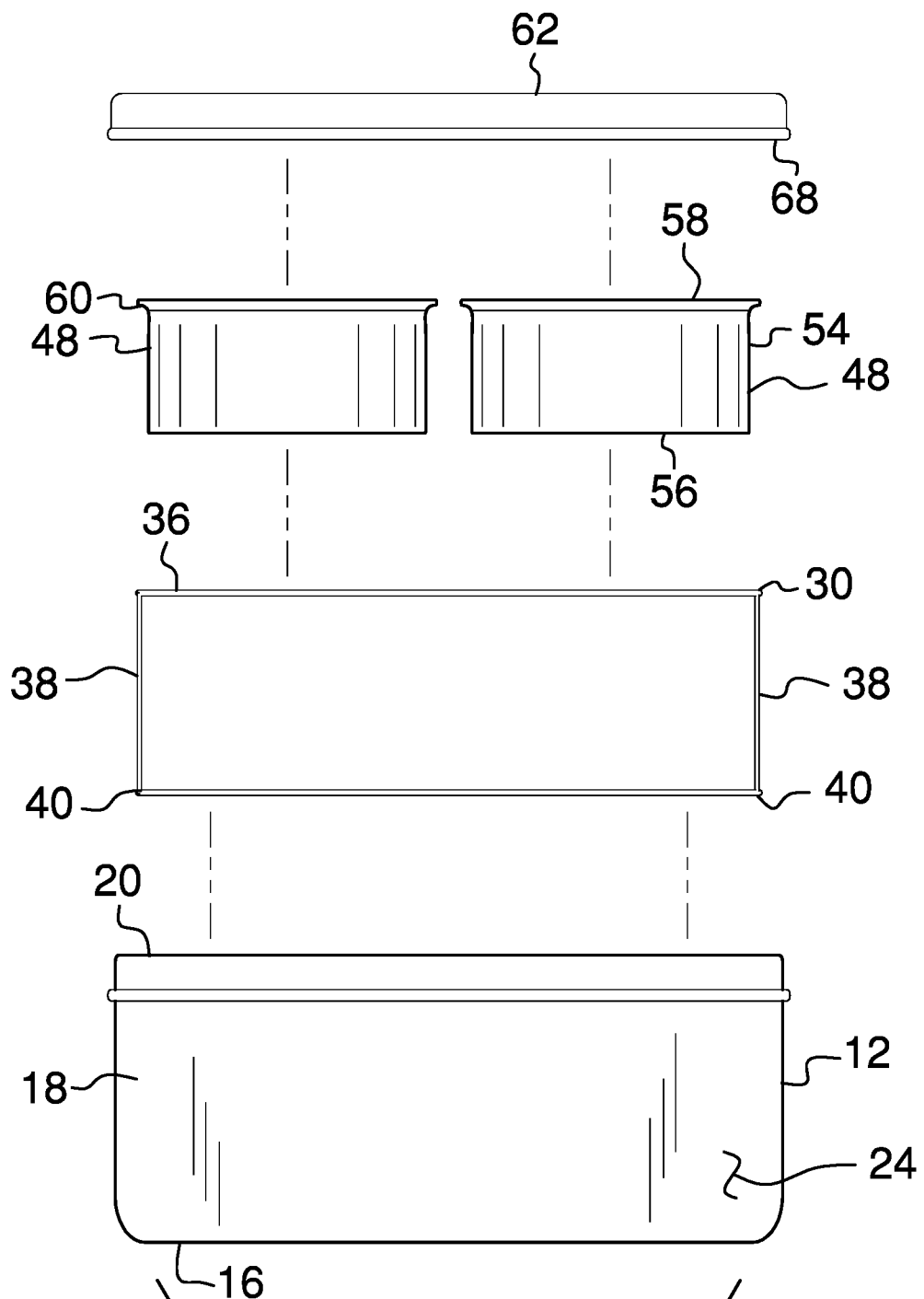
FIG. 3 is an exploded front view of an embodiment of the disclosure.
Figure 4:
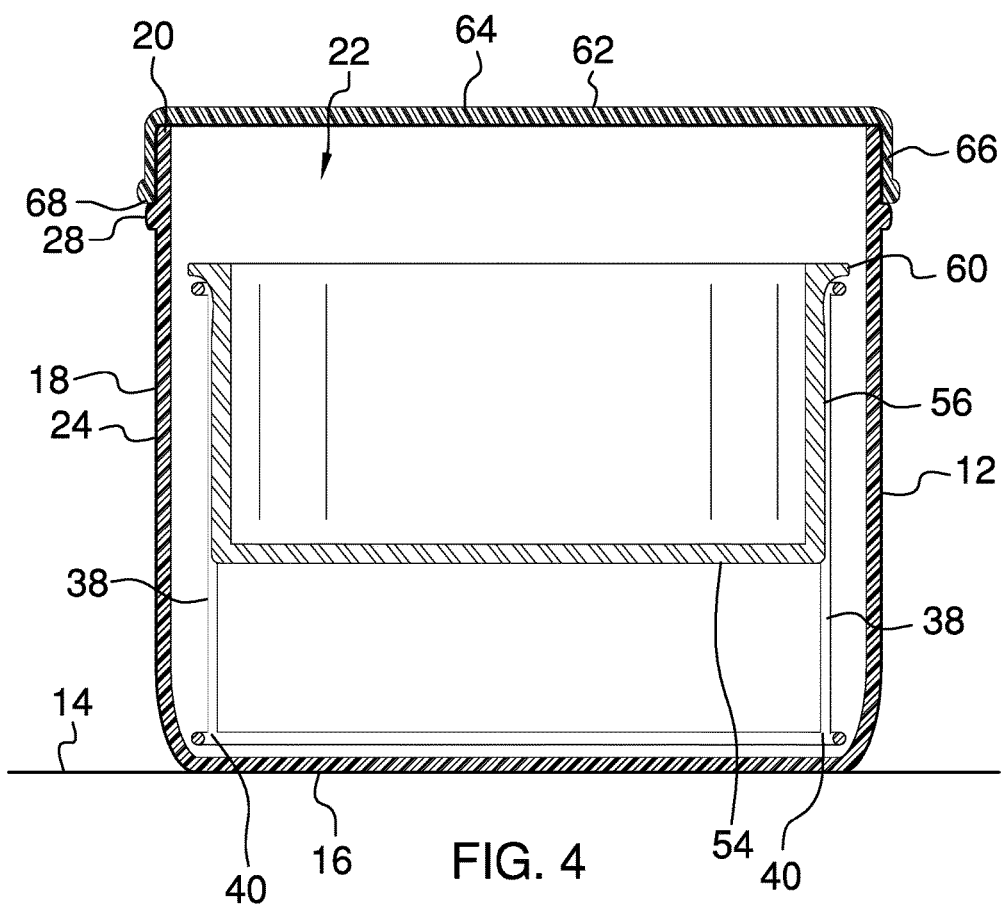
FIG. 4 is a cross sectional view taken along line 4-4 of FIG. 2 of an embodiment of the disclosure.
Figure 5:
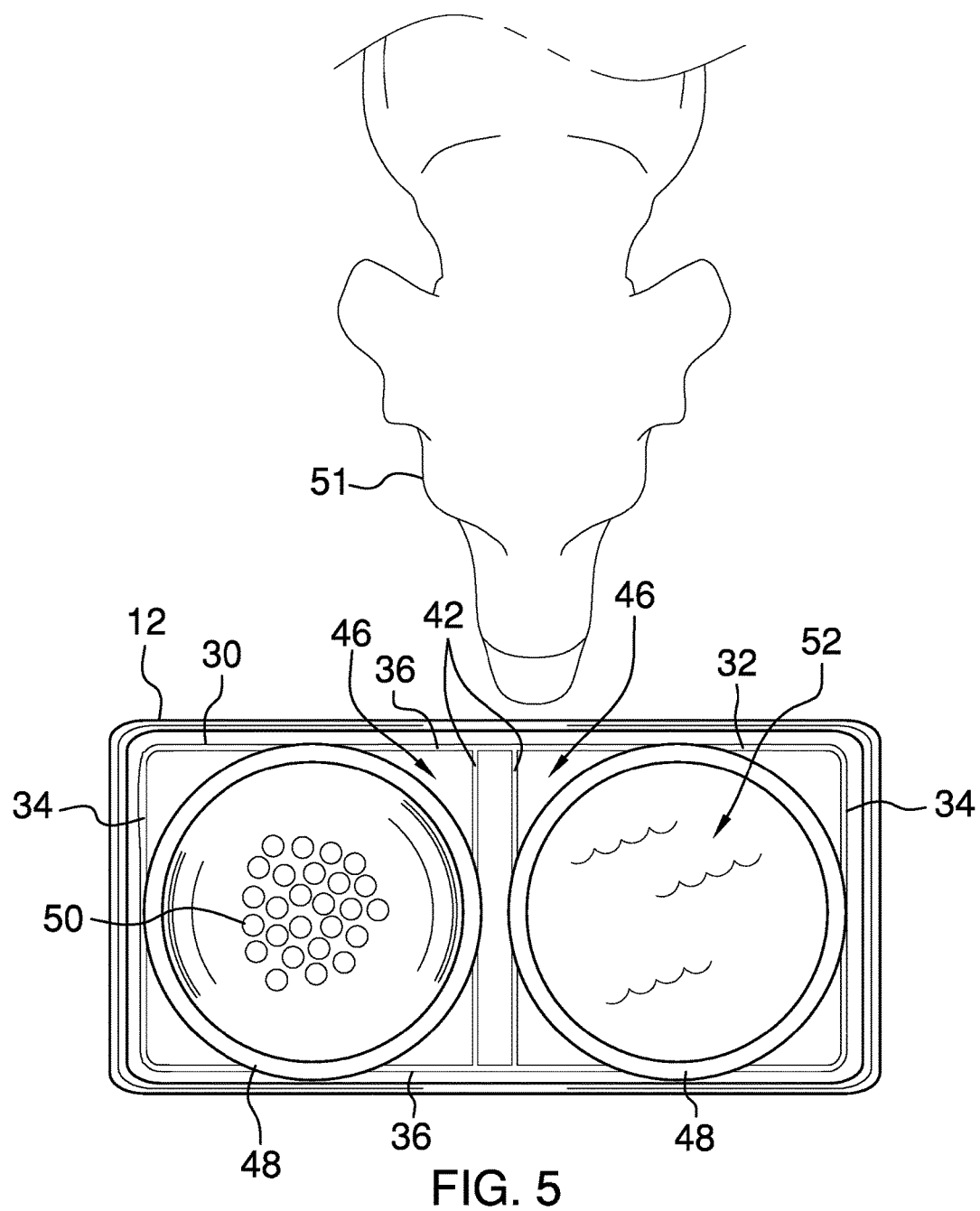
FIG. 5 is a top view of an embodiment of the disclosure.

With reference now to the drawings, and in particular to FIGS. 1 through 5 thereof, a new feeding device embodying the principles and concepts of an embodiment of the disclosure and generally designated by the reference numeral 10 will be described.

As best illustrated in FIGS. 1 through 5, the animal feeding assembly 10 generally comprises a pan 12 that may be positioned on a support surface 14. The support surface 14 may be a floor or the like. The pan 12 has a basal wall 16 and a peripheral wall 18 extending upwardly therefrom. The peripheral wall 18 has a distal edge 20 with respect to the basal wall 16. Moreover, the distal edge 20 defines an opening 22 into the pan 12. The peripheral wall 18 has an outer surface 24 and the basal wall 16 has a top surface 26.

The pan 12 includes a lip 28. The lip 28 is coupled to and extends outwardly from the outer surface 24 of the peripheral wall 18. The lip 28 is continuous. Moreover, the lip 28 is positioned closer to the distal edge 20 than the basal wall 16.

A rack 30 is provided and the rack 30 is selectively positioned in the pan 12. The rack 30 comprises a frame 32. The frame 32 has a pair of lateral members 34 extending between a pair of longitudinal members 36. The lateral members 34 are spaced apart from each other such that the frame 32 has a rectangular shape.

The rack 30 includes a plurality of legs 38. Each of the legs 38 is coupled to and extends downwardly from the frame 32. Each of the legs 38 is positioned at an associated one of four corners of the frame 32. Moreover, each of the legs 38 has a distal end 40 with respect to the frame 32. The distal end 40 corresponding to each of the legs 38 abuts the top surface 26 of the basal wall 16 has the frame 32 is spaced from the basal wall 16.

The rack 30 includes a pair of center members 42. Each of the center members 42 extends between the pair of longitudinal members 36. Each of the center members 42 is spaced apart from a middle 44 of the longitudinal members 36. Moreover, each of the center members 42 defines an associated one of a pair of bowl spaces 46 between the center members 42 and associated one of the lateral members 34. A pair of the racks 30 may be provided. The legs 38 may extend between each of the pair of racks 30.

A pair of bowls 48 is provided. Animal food 50 may be placed in one of the bowls 48 thereby facilitating an animal 51 to eat the animal food 50. Water 52 may be placed in one of the bowls 48 thereby facilitating the animal 51 to drink the water 52. The animal 51 may be a large breed dog or the like. The animal food 50 may be dog food. Each of the bowls 48 is selectively positioned on the rack 30. The pan 12 captures spilled animal food 50 and water 52 when the animal 51 eats and drinks. Thus, the animal food 50 and water 52 are inhibited from spilling onto the support surface 14.

Each of the bowls 48 has a bottom wall 54 and an outer wall 56 extending upwardly therefrom. The outer wall 56 has a distal edge 58 with respect to the bottom wall 54. The outer wall 56 corresponding to each of the bowls 48 curves outwardly along the distal edge 20 to define a ledge 60 on each of the bowls 48. The ledge 60 corresponding to each of the bowls 48 engages the frame 32 and an associated one of the center members 42. Thus, each of the bowls 48 is spaced from the basal wall 16 of the pan 12.

A lid 62 is selectively positioned on the pan 12. The lid 62 inhibits the animal food 50 and water 52 from spilling onto the support surface 14. The lid 62 has a top wall 64 and a perimeter wall 66 extending downwardly therefrom. The perimeter wall 66 has a distal edge 68 with respect to the top wall 64. The distal edge 68 of the lid 62 engages the lip 28 on the pan 12 when the lid 62 is positioned on the pan 12.

In use, the pan 12 is positioned on the support surface 14. The rack 30 is positioned in the pan 12. Each of the bowls 48 is positioned on the rack 30. The animal food 50 and the water 52 are placed in an associated bowl. Thus, the animal 51 selectively eats the animal food 50 and drinks the water 52. The pan 12 captures spilled animal food 50 and water 52. Thus, the pan 12 inhibits the spilled animal food 50 and water 52 from contacting the support surface 14. The lid 62 is positioned on the pan 12 when the animal 51 is finished eating and drinking.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An animal feeding assembly being configured to inhibit animal food from spilling onto a floor when an animal feeds, said assembly comprising:
   a pan being configured to be positioned on a support surface, said pan having a basal wall;
   a rack being selectively positioned in said pan, said rack comprising a frame having a pair of lateral members extending between a pair of longitudinal members, said lateral members and said longitudinal members being positioned such that said frame has a rectangular shape, said frame having a pair of center members, each of said center members being coupled to and extending between said longitudinal members, said center members being positioned to define a pair of squares within said rectangular shape;
   a pair of bowls, a selected one of said bowls being configured to contain animal food thereby facilitating an animal to eat the animal food, a selected one of said bowls being configured to contain water thereby facilitating the animal to drink the water, each of said bowls being selectively positioned on said rack wherein said pan is configured to capture the animal food and water when the animal eats and drinks thereby inhibiting the animal food and water from spilling onto the support surface, each of said bowls having a bottom wall and an outer wall extending upwardly therefrom, said outer wall having a distal edge with respect to said bottom wall, said outer wall corresponding to each of said bowls curving outwardly along said distal edge of said outer wall to define a circular ledge on each of said bowls, said ledge corresponding to each of said bowls engaging said frame and an associated one of said center members such that each of said bowls rests within a respective one of said squares and is spaced from said basal wall of said pan; and
   a lid being selectively positioned on said pan wherein said lid is configured to inhibit the animal food and water from spilling onto the support surface.

2. The assembly according to claim 1, wherein said pan has a basal wall and a peripheral wall extending upwardly therefrom, said peripheral wall having a distal edge with respect to said basal wall, said distal edge of said peripheral wall defining an opening into said pan, said peripheral wall having an outer surface, said basal wall having a top surface.

3. The assembly according to claim 2, further comprising a lip being coupled to and extending outwardly from said outer surface of said peripheral wall, said lip being continuous, said lip being positioned closer to said distal edge of said peripheral wall than said basal wall.

4. The assembly according to claim 1, further comprising:
   said basal wall having a top surface; and
   a plurality of legs, each of said legs being coupled to and extending downwardly from said frame, each of said legs being positioned at an associated one of four corners of said frame, each of said legs having a distal end with respect to said frame, said distal end corresponding to each of said legs abutting said top surface of said basal wall having said frame being spaced from said basal wall.

5. The assembly according to claim 1, wherein:
   said pan has a lip; and
   said lid has a top wall and a perimeter wall extending downwardly therefrom, said perimeter wall having a distal edge with respect to said top wall, said distal edge of said perimeter wall of said lid engaging said lip on said pan when said lid is positioned on said pan.

6. An animal feeding assembly being configured to inhibit animal food from spilling onto a floor when an animal feeds, said assembly comprising:
   a pan being configured to be positioned on a support surface, said pan having a basal wall and a peripheral wall extending upwardly therefrom, said peripheral wall having a distal edge with respect to said basal wall, said distal edge of said peripheral wall defining an opening into said pan, said peripheral wall having an outer surface, said basal wall having a top surface;
   a lip being coupled to and extending outwardly from said outer surface of said peripheral wall, said lip being continuous, said lip being positioned closer to said distal edge of said peripheral wall than said basal wall;

a rack being selectively positioned in said pan, said rack comprising:
  a frame having a pair of lateral members extending between a pair of longitudinal members, said lateral members and said longitudinal members being positioned such that said frame has a rectangular shape,
  a plurality of legs, each of said legs being coupled to and extending downwardly from said frame, each of said legs being positioned at an associated one of four corners of said frame, each of said legs having a distal end with respect to said frame, said distal end corresponding to each of said legs abutting said top surface of said basal wall having said frame being spaced from said basal wall, and
  a pair of center members, said frame having a pair of center members, each of said center members being coupled to and extending between said longitudinal members, said center members being positioned to define a pair of squares within said rectangular shape;

a pair of bowls, a selected one of said bowls being configured to contain animal food thereby facilitating the animal to eat the animal food, another selected one of said bowls being configured to contain water thereby facilitating the animal to drink the water, each of said bowls being selectively positioned on said rack wherein said pan is configured to capture the animal food and water when the animal eats and drinks thereby inhibiting the animal food and water from spilling onto the support surface, each of said bowls having a bottom wall and an outer wall extending upwardly therefrom, said outer wall having a distal edge with respect to said bottom wall, said outer wall corresponding to each of said bowls curving outwardly along said distal edge of said outer wall to define a circular ledge on each of said bowls, said ledge corresponding to each of said bowls engaging said frame and an associated one of said center members such that each of said bowls rests within a respective one of said squares and is spaced from said basal wall of said pan; and a lid being selectively positioned on said pan wherein said lid is configured to inhibit the animal food and water from spilling onto the support surface, said lid having a top wall and a perimeter wall extending downwardly therefrom, said perimeter wall having a distal edge with respect to said top wall, said distal edge of said perimeter wall of said lid engaging said lip on said pan when said lid is positioned on said pan.

* * * * *